No. 715,499. Patented Dec. 9, 1902.
F. MOSSBERG.
APPARATUS FOR SHARPENING PENCILS.
(Application filed Feb. 12, 1902.)
(No Model.) 2 Sheets—Sheet 2.
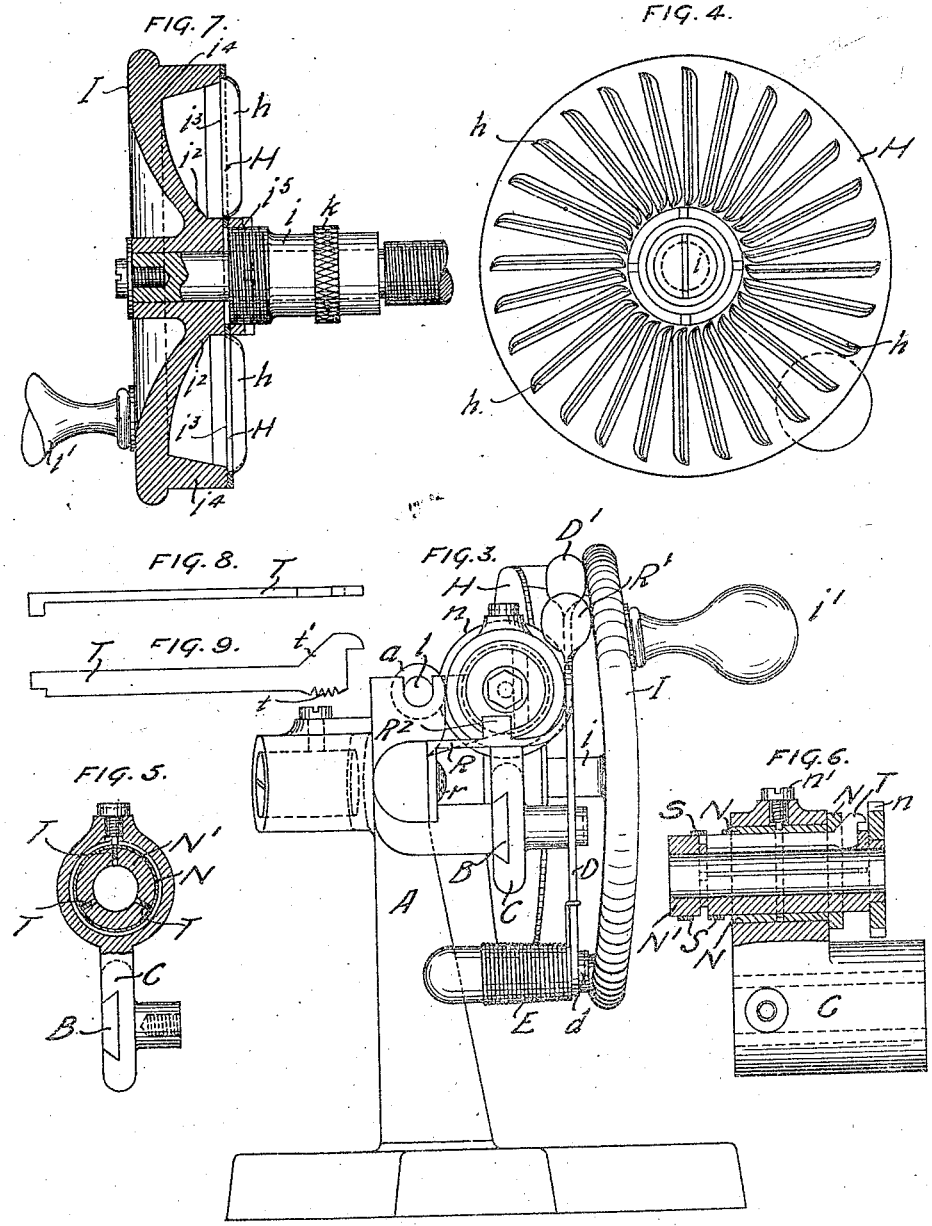
WITNESSES:
Annie A. Willis
Edward G. Carr
INVENTOR
Frank Mossberg
BY
W. R. Tillinghast
ATTORNEY

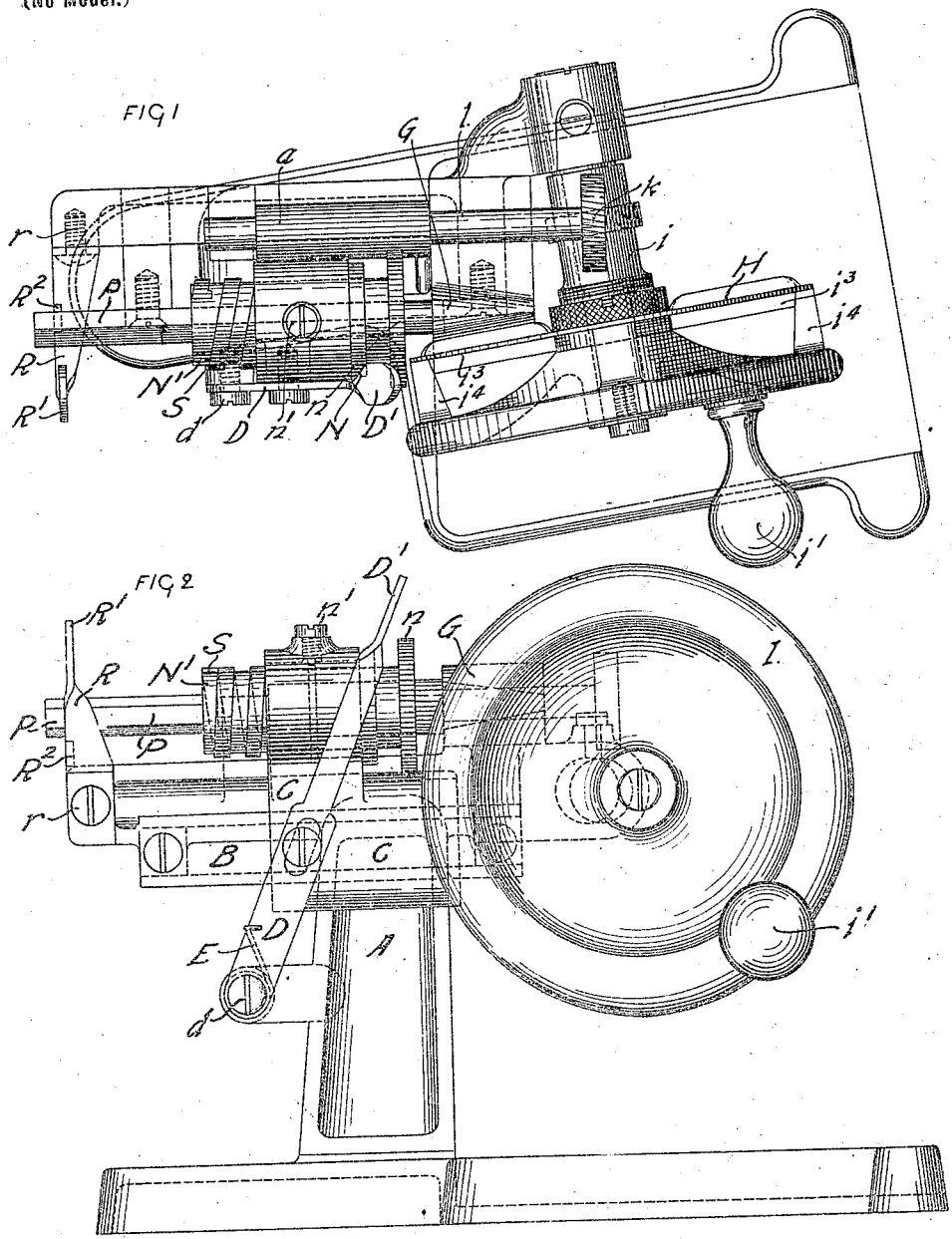

UNITED STATES PATENT OFFICE.

FRANK MOSSBERG, OF ATTLEBORO, MASSACHUSETTS.

APPARATUS FOR SHARPENING PENCILS.

SPECIFICATION forming part of Letters Patent No. 715,499, dated December 9, 1902.

Application filed February 12, 1902. Serial No. 93,779. (No model.)

*To all whom it may concern:*

Be it known that I, FRANK MOSSBERG, of the town of Attleboro, in the county of Bristol and State of Massachusetts, have invented a new and useful Improvement in Apparatus for Sharpening Pencils, of which the following, with the accompanying drawings, is a description.

My apparatus is an improvement of the apparatus shown in the patent to Herman Guhl, No. 593,093, and dated November 2, 1897; and it consists more specifically in improvements in the cutter-disk and its supporting parts and in the chuck for holding the pencil while being sharpened.

My improvement in the cutter-disk consists in making it by a new method, resulting in a new disk which is very much cheaper to make and equally or more effective.

The improvements in the chuck make it self-feeding and at the same time make the entire apparatus much more compact.

Figure 1 of the drawings is a substantially full size plan of the apparatus embodying my invention. Fig. 2 is a front elevation, and Fig. 3 an end elevation, of the same. Fig. 4 is a full-sized view of my new cutter-disk. Figs. 5 and 6 are respectively cross and longitudinal sections of my new chuck and parts immediately connected with it. Fig. 7 is a view largely in section, showing how the cutter-disk is mounted upon the rotary wheel and other parts immediately connected with the wheel and disk; and Figs. 8 and 9 are enlarged views of the toothed jaws for holding the pencil.

I will first describe the general apparatus sufficiently for one to understand its workings and will later describe my improvements more specifically. The pencil to be sharpened is inserted and held in a chuck held in the upper part of a carriage C, as best shown in Fig. 2, where the pencil is indicated by P. The construction of this chuck will be hereinafter described. The end of the pencil to be sharpened is inserted in a conical holder G (shown in Fig. 1 and in outline in Fig. 2) of substantially the same construction as in the Guhl patent. The cutter-disk H is mounted upon a wheel I, (see Figs. 1 and 7,) capable of being rotated by the handle $i'$, and is placed at an angle to the length of the pencil, as in the earlier apparatus. The chuck is rotated in the same manner as in the Guhl patent by means of the skew bevel-gears $k$, (see Figs. 1 and 7,) mounted on the shaft $i$, Figs. 1, 3, and 7, and $l$, Figs. 1 and 3, on a second shaft, upon which latter there is a long toothed gear $a$, Figs. 1 and 3. This latter gear $a$ meshes with a pinion $n$, Figs. 1, 2, and 3, which rotates the chuck and the pencil inserted therein.

Having thus described the general operation of the apparatus, I will next describe more in detail my improved chuck.

Upon the side of the frame or standard A of the apparatus is a guide-bar B, (see Fig. 2, also Fig. 5,) as in the Guhl patent, but very much shorter, and mounted to slide upon it is a carriage C, Fig. 2, in which the chuck is rotatably mounted. A lever-arm D, Figs. 2 and 3, is pivoted at $d$ to a lateral extension or bracket of the frame A and extends upwardly, ending in a finger-piece $D'$. Through a slot near the middle of this lever D is a screw connecting it to the carriage C, and thereby controlling the motion of the carriage, as hereinafter described. A coiled spring E, Fig. 3, also Fig. 2, tends to move the lever D, and consequently the carriage C, toward the cutter-disk, so that when the pencil is inserted and held in the chuck, as hereinafter described, it will be automatically fed forward as the cutter acts upon it. The upper portion of the carriage C is bored out or made hollow lengthwise to contain the chuck and permit it to be rotated therein by the gearing already described.

Referring now more particularly to Figs. 5 and 6, the chuck consists of two hollow thimbles or barrels N and N', one within the other, but with the inner barrel N' extending farther to the rear than the outer one. The gear $n$, hereinbefore referred to, is rigidly attached to the inner barrel N'. As I have heretofore constructed these thimbles or barrels both rotate together, but there is nothing in the required functions to make it necessary that they do so, it being sufficient if the inner barrel N' alone rotates. Lengthwise of the barrels are the three jaws T T, (shown separately and enlarged in Figs. 8 and 9,) having teeth $t$ upon their forward ends and a wedge surface $t'$, Fig. 9, above the teeth.

These jaws are inserted in the barrel N' in such a way that they will move with it both rotatably and longitudinally and the teeth will at the same time project into the hollow barrel N', so as to grip the pencil. The forward end of the outer barrel N has an inner wedge-surface corresponding in pitch to the bevel of the surface t', and surrounding the rear projecting end of the barrel N' is a flat circular spring S, which is shown in Fig. 6, but is better seen in Figs. 1 and 2. The rear end of the spring S is turned downward and inserted into a hole in the inner barrel N' to furnish a rigid rear bearing for it. This end may be seen in Fig. 1. The forward end of the spring S rests against the rear of the outer barrel N. The effect and function of this spring S is therefore to normally keep the outer barrel N pushed forward upon the inner one, so as to cause the inner bevel of its forward end to press upon the wedge-surface t' of the jaws T, and thus to push them inwardly upon the pencil. At the rear of the apparatus and attached rigidly to the frame of the machine by the screw r is an arm R, Figs. 1, 2, and 3, curved across the apparatus and upward and ending in a thumb-piece R'. The arm R also has upon it and preferably made integral with it an upwardly-projecting piece R², (best shown in Fig. 3, but also indicated in Figs. 1 and 2,) which is in the path of and acts as a stop for the inner barrel N' of the chuck when pressed backwardly, as hereinafter described. A groove is cut around the outer barrel N about the middle of its length, and a screw n', Figs. 1, 2, and 3, passes through the upper part of the carriage C and into this groove, so as to force the outer barrel N to follow any longitudinal motion of the carriage C. The operation of this portion of the apparatus is as follows: When the operator wishes to insert or withdraw a pencil, he places his thumb and forefinger upon the pieces R' and D', respectively, and presses them toward each other. The effect is to slide the carriage C to the rear along the guide B against the tension of the spring E until the inner barrel N' of the chuck comes into contact with the stop R². Upon continuing the pressure the outer barrel N is caused to slide backward upon the inner barrel N' against the tension of the spring S, and consequently the pressure exerted upon the jaws T T by the action of the forward end of the barrel N upon the wedge-surfaces t' t' is removed and the pencil may be readily inserted or withdrawn from between the teeth of the jaws. In inserting the pencil it is pushed sufficiently through the chuck and run into the guide G, and then the pressure upon the pieces R' and D' is removed. The springs S will cause the jaws to grip the pencil firmly, and the spring E will feed the pencil forward against the cutter-disk.

The cutter-disk H (shown separately in Fig. 4) is made of soft sheet-steel about three sixty-fourths of an inch thick, as follows: Radial cuts are made, leaving a plain surface in the center of the disk and extending nearly to but not reaching the outer circumference. The metal immediately at one side of each cut is pressed up, forming ridges h, Figs. 4 and 7. Both the cutting and the turning up of the adjoining metal may be readily done at the same time. The soft metal yields sufficiently to permit the metal to be pressed up without any cuts parallel with the circumference at either end of the radial cuts, thus making strong and rigid edges upturned above the normal surface of the disk. The soft steel is then hardened and the upturned edges sharpened to form cutters. The cutter-disk made in this manner is very inexpensive as compared with any disk made by cutting away the metal and is at least equally as effective. In order to properly support a thin cutter-disk of the nature described, the wheel I is constructed in the rear, as more particularly shown in Fig. 7, having a central boss $i^2$ and rim $i^3$, (see also Fig. 1,) the surfaces of which are in the same plane, the rim $i^3$ being supported by the projections $i^4$ from the main portion of the wheel I. The cutter-disk H is slipped over the shaft $i$ until it rests on the surfaces of the boss $i^2$ and the rim $i^3$, and a nut $i^5$ is screwed upon the shaft and firmly against it to hold it firmly in place. This construction gives a cutter mounted upon a framework in such a way that the shavings may pass through the cutter into the space behind and thence drop from the wheel as a whole into any receptacle placed below it.

The turning of the wheel I will operate the entire apparatus, as in the Guhl patent; but in my improved apparatus the pencil will be automatically fed forward upon the cutter.

If it were not for the cutting action and friction of the inclined surfaces or wedges of the jaws upon the inner inclined surface coacting with them, which would otherwise take place, there would be no need of the outer thimble or barrel N, for the inner inclined surface might otherwise be made upon the end of the surrounding casing of the carriage C. As it is, however, the rotation of the outer barrel N with the inner one N' prevents any such friction and cutting action.

I claim as my invention—

1. In a pencil-sharpening machine, the combination of a cutter-disk located at an angle to the length of the pencil and a suitable guide for the pointed end of the pencil, with a guide-bar, a rotatable chuck containing means for holding the pencil arranged to move longitudinally upon the guide-bar, a spring to cause the chuck to move upon the bar and feed the pencil against the cutter, and means for rotating the cutter and the chuck.

2. In a pencil-sharpening machine, a chuck for holding the pencil, consisting of a hollow barrel or thimble through which the pencil may be inserted, jaws within the barrel to grip the pencil and having inclined wedge-surfaces, a second thimble surrounding the first and having an inclined surface to coact with the inclined surfaces of the jaws, a spring to normally hold the inclined surfaces of the thimble and jaws in contact to press the jaws inwardly, and means to prevent the pressure of the spring and release the pressure upon the jaws when desired by the operator.

3. In a pencil-sharpening machine, the combination of a cutter, a chuck movable longitudinally toward and away from the cutter and containing jaws for gripping the pencil, a spring to normally hold the jaws in gripping position, a spring to normally move the chuck toward the cutter, and means whereby the chuck may be moved from the cutter and the jaws released from their gripping position by the same movement.

4. In a pencil-sharpening machine, the combination of a cutter, a guide-bar, and a carriage to move upon the guide to feed the pencil to the cutter, combined with a chuck mounted in the carriage and consisting of a hollow rotatable barrel or thimble through which the pencil may be inserted, jaws within the barrel to grip the pencil and having inclined wedge-surfaces, a second thimble surrounding the first and having an inclined surface to coact with the inclined surfaces of the jaws, and a spring to normally hold the inclined surfaces of the second thimble and jaws in contact to press the jaws inwardly, and with a spring to normally move the carriage toward the cutter, means for rotating the cutter and the chuck, and means by which the operator may move the carriage away from the cutter and compress the spring acting upon the inclined surfaces so as to release the pressure upon the jaws.

5. In a pencil-sharpening machine, the combination of a cutter, and a chuck to hold the pencil consisting of a non-rotatable part, a hollow rotatable barrel or thimble through which the pencil may be inserted, jaws having teeth within the barrel to grip the pencil and inclined wedge-surfaces, a second thimble surrounding the first and having an inclined surface to coact with the inclined surfaces of the jaws, and a spring to normally hold the inclined surfaces of the second thimble and jaws in contact to press the teeth of the jaws inwardly, with a spring to normally move the chuck toward the cutter, a stationary thumb-piece, a finger-piece connected to the non-rotatable portion of the chuck, and a stop by which the spring upon the inclined surfaces may be compressed when the thumb and finger pieces are brought near together.

6. In a pencil-sharpening machine, a cutter-disk constructed of sheet metal, having a plain center and radial cuts from such center toward but not reaching the circumference, and the metal adjoining and on one side of the cuts turned up and sharpened into cutting edges, mounted upon a framework supporting the disk in its center and at its circumference, but open to permit any shavings to pass through the cuts in the disk and fall from the supporting-framework.

7. In a pencil-sharpening machine, a cutter-disk constructed of sheet metal, having radial cuts from the center toward but not reaching the circumference and the metal adjoining and on one side of the cuts turned up and sharpened into cutting edges, a framework supporting and stiffening the disk, combined with a pencil-holder, means for moving the holder longitudinally to feed the pencil at an acute angle to the cutter, and means for rotating the cutter and pencil-holder.

8. In a pencil-sharpening machine, a cutter-disk constructed of sheet metal, having a plain center and radial cuts from such center toward but not reaching the circumference, and the metal adjoining and on one side of the cuts turned up and sharpened into cutting edges, and a framework supporting the disk in its center and at its circumference but open to permit the shavings to pass through the cuts and fall from the supporting-framework, combined with a rotatable chuck movable longitudinally toward and away from the cutter and containing jaws for gripping the pencil, a spring to normally hold the jaws in gripping position, a spring to normally move the chuck toward the cutter, means whereby the chuck may be moved from the cutter and the jaws released from their gripping position by the same movement, and means for rotating the cutter and chuck.

FRANK MOSSBERG.

Witnesses:
ANNIE A. WILLIS,
WM. R. TILLINGHAST.